United States Patent [19]
Bowen et al.

[11] Patent Number: 5,625,697
[45] Date of Patent: Apr. 29, 1997

[54] MICROPHONE SELECTION PROCESS FOR USE IN A MULTIPLE MICROPHONE VOICE ACTUATED SWITCHING SYSTEM

[75] Inventors: Donald J. Bowen, Madison; Gregory Ciurpita, Jr., Somerset, both of N.J.

[73] Assignee: Lucent Technologies Inc., Murray Hill, N.J.

[21] Appl. No.: 436,671

[22] Filed: May 8, 1995

[51] Int. Cl.$^6$ ................................................. H04R 3/00
[52] U.S. Cl. ........................... 381/92; 367/126; 379/202; 379/206
[58] Field of Search ............................. 381/92, 26, 122; 379/202, 206; 367/126

[56] References Cited

U.S. PATENT DOCUMENTS

| | | | |
|---|---|---|---|
| 4,489,442 | 12/1984 | Anderson et al. | 381/92 |
| 4,653,102 | 3/1987 | Hansen | 381/92 |
| 4,658,425 | 4/1987 | Julstrom | 381/81 |
| 4,675,906 | 6/1987 | Sessler et al. | 381/92 |
| 4,965,775 | 10/1990 | Elko et al. | 367/119 |
| 5,210,784 | 5/1993 | Wang et al. | 379/37 |
| 5,297,210 | 3/1994 | Julstrom | 381/66 |
| 5,524,059 | 6/1996 | Zurcher | 381/92 |

OTHER PUBLICATIONS

Dorian Benkoil, "The Shure ST3000 System," *Teleconnect Magazine*, Jun. 1986.

*Primary Examiner*—Forester W. Isen
*Attorney, Agent, or Firm*—Samuel R. Williamson

[57] ABSTRACT

A microphone selection process is made relatively constant in terms of processing requirements through use of combination values which provide a measure of the quality of the speech signal received in each one of a plurality of microphones. Such combination values are derived in a manner which provides an indication of which one of the plurality of microphones, that provide area coverage for a conference room, for example, best receives the speech signal. In operation, the microphone selection process selects the microphone which best receives the speech signal by comparing a signal energy value received in each one of the microphones to that received in each of the other microphones. More specifically, pairs of microphones are examined, to determine the direction of origin for the speech, by seeking a microphone pair where the speech is strong in the microphone directed toward the source of speech, and weak in an associated microphone directed away from the source of speech. Since a null, which is located at the back of each microphone, is narrower than a main beam or sensitivity pattern, which is located at the front of each microphone, this null is more sensitive to and therefore a better indicator of the direction of origin for the speech than is the main beam. The combination of the signal energy values for each pair of microphones advantageously provides a specific combination value which is used to identify and select the microphone which best receives the speech signal.

32 Claims, 4 Drawing Sheets

MICROPHONE SELECTION PROCESS FOR USE IN A MULTIPLE MICROPHONE VOICE ACTUATED SWITCHING SYSTEM

BACKGROUND OF THE INVENTION

1. Technical Field

This invention relates to audio systems and, more particularly, to systems for selectively connecting speech circuits to an audio line in response to voice signals.

2. Description of the Prior Art

Many companies now consider teleconferencing as a cost effective way of communicating among personnel at dispersed locations and thereby reducing the need for business travel. In an audio teleconferencing arrangement, a number of conferees at a location are placed in communication with a number of conferees at one or more remote locations via a telephone connection. The quality of the transmission between the separated groups of conferees is generally dependent upon the position of each conferee with respect to a microphone and loudspeaking device at each location. With a single microphone and loudspeaking device in a room at a conference location, the transmission is subject to degradation because some of the conferees are generally at a greater than optimum distance from the microphone and loudspeaking device.

It is well known to use a plurality of microphones appropriately spaced at each conference location to improve the quality of the conference system. The microphone outputs are summed and the summed output is applied to a communication link then established between locations. In such an arrangement, each conferee can be within an acceptable distance from one of the microphones, whereby speech pickup is of relatively good quality. With all microphones turned on at one time, however, several undesirable effects occur. The total noise pickup is much greater than for a single microphone. The artificial reverberation effects occasioned by the delayed signal pickup from the more remote microphones severely lower the quality of the conference transmission. Further, electroacoustic instability can easily result from the plurality of the always turned-on microphones. It is therefore desirable and also known in the art to provide a switching arrangement which permits only that microphone closest to the talking conferee to be active so that reverberation and noise pickup are minimized.

Such an arrangement is commonly known as a "voting circuit." In the "voting circuit" arrangement, the loudest talker can capture control and lock out the other conferees at his or her location. This automatic switching between microphones, responsive to the highest speech level input alternately appearing at different microphones, however, may also result in transmission interruptions which adversely affect intelligibility and can result in unwanted interference occasioned by transient room noise. For example, a loud noise at one of the conference locations may completely turn off the controlling microphone. Further, since only one microphone is operative at a time, transfer of control from one microphone to another, such as occasioned by the talking conferee moving from one position to another in a room location, can result in speech transmission of varying quality, interruptions in transmission, and reverberation effects which vary with the talking conferee's position.

Various teleconferencing arrangements have been proposed and used heretofore for selecting a single microphone from a plurality of conferee microphones and for transmitting the signal from only the selected microphone. Such arrangements are described in, for example, U.S. Pat. No. 3,730,995 issued to M. V. Matthews on May 1, 1973, U.S. Pat. No. 3,755,625 issued to D. J. Maston on Aug. 28, 1973, U.S. Pat. No. 4,449,238 issued to B. H. Lee, et al. on May 15, 1984, and U.S. Pat. No. 4,658,425 issued to S. D. Julstrom on Apr. 14, 1987.

Another example of a teleconferencing arrangement is disclosed in co-pending U.S. patent application Ser. No. 08/239771 filed on May 9, 1994 on behalf of D. J. Bowen and commonly assigned to the same assignee along with this application. In this co-pending application, a voice-actuated switching arrangement provides for the selection of one or more microphones in accordance with the output signal levels from each of the microphones.

Also, the voice actuated switching arrangement described in the co-pending application employs directional microphones to reduce the degradation of speech signals due to reverberation and noise pickup. These directional microphones are located in a common circular housing and have sensitivity response patterns extending outwardly from the center of the housing. The voice actuated switching arrangement also employs a voting algorithm or process to select for actuation the appropriate number of these microphones for effectively monitoring each person that speaks in a room.

The above-described voice actuated switching arrangement has been satisfactory in minimizing the degradation of the speech signals due to reverberation and noise pickup. It has similarly been satisfactory in causing the microphone selection technique to appear to occur in a quite normal manner without, for example, syllabic clipping as microphones are turned on from the off state. It is nevertheless desirable to simplify the execution of the microphone selection technique so that this technique may be performed in a limited amount of processing time. Such simplification would free a processor more regularly for other necessary computations or enable the use of a less powerful and more economical processor in the switching arrangement.

SUMMARY OF THE INVENTION

In accordance with the present invention, a microphone selection process is made relatively constant in terms of processing requirements through use of combination values which provide a measure of the quality of the speech signal received in each one of a plurality of microphones. Such combination values are derived in a manner which provides an indication of the microphone that best receives the speech signal. Each of the microphones has a supercardiod response pattern, and collectively the microphones are positioned to provide full area coverage for a typical conference room.

In accordance with an aspect of the invention, the microphone selection process selects the microphone which best receives the speech signal by comparing a signal energy value received in each one of the microphones to that received in each of the other microphones. More specifically, pairs of microphones are examined, to determine the direction of origin for the speech, by seeking a microphone pair where the speech is strong in the forward facing microphone, i.e., the microphone directed toward the source of speech, and weak in an associated backward facing microphone, i.e., the microphone directed away from the source of speech. Since a null, which is located at the back of each microphone, is narrower than a main beam or sensitivity pattern, which is located at the front of each microphone, this null is more sensitive to and therefore a better indicator of the direction of origin for the speech than is the main beam. The combination of the signal energy values for a forward facing microphone and its respectively associated backward facing microphone advantageously provides a specific combination value which is compared to each of the other microphone pairs in the switching arrangement. The microphone pair having the best combination value is then easily determined for identifying and selecting the microphone which best receives the speech signal.

BRIEF DESCRIPTION OF THE DRAWING

The invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
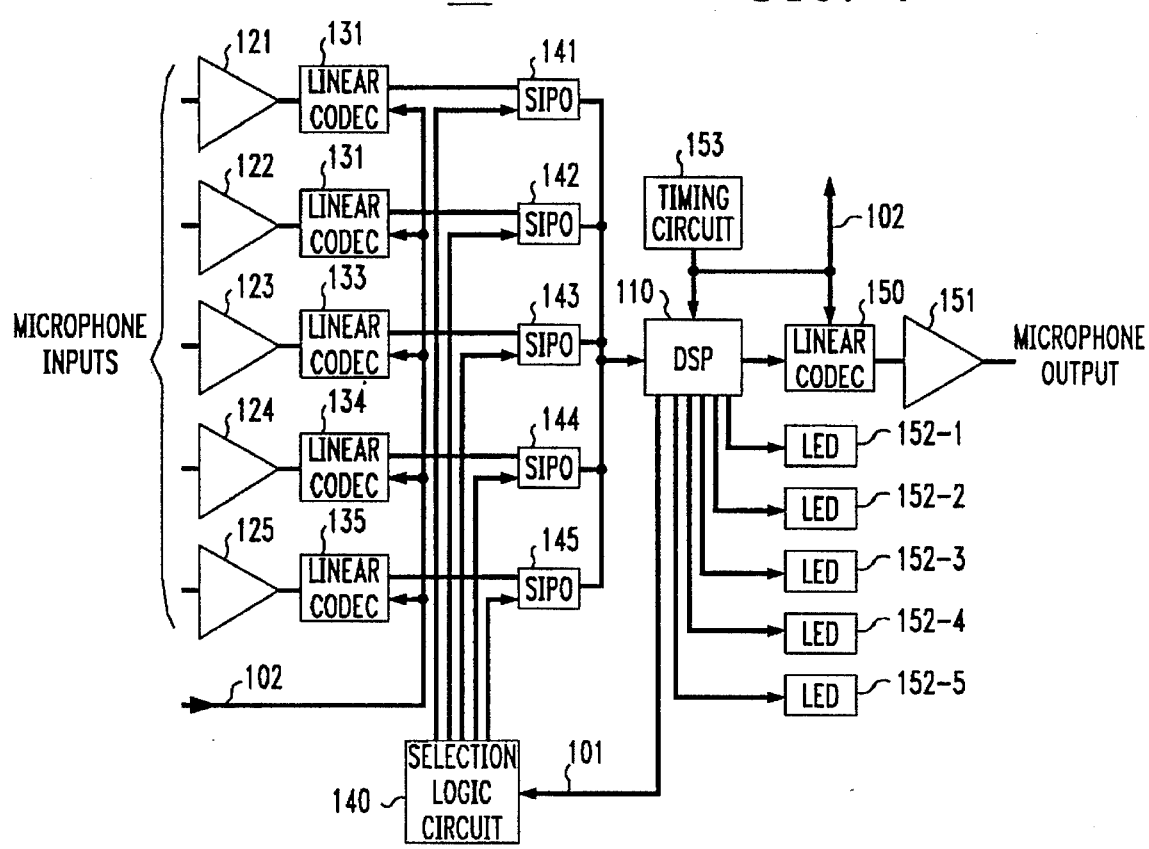
FIG. 1 is a block-level diagram of conference array microphone circuitry, arranged in accordance with the present invention.

Referring now to FIG. 1, there is shown a block-level diagram of conference array microphone (CAM) circuitry 100. Included in the CAM circuitry 100 is a digital signal processor (DSP) 110, five separate input circuits consisting of amplifiers 121 through 125 and respectively associated linear CODECs 131 through 135. Each one of these input circuits is associated with each one of first-order-gradient microphones contained in a CAM housing 200 shown in FIG. 2 and described later herein. The CAM circuitry 100 also includes a selection logic circuit 140 for selecting each one of the five input circuits for respectively providing its microphone signal to the DSP 110 via five serial-in-parallel-out (SIPO) or serial-to-parallel converters 141 through 145. The output of the DSP 110 is provided to an output circuit comprising a linear CODEC 150 and an output amplifier 151. The DSP 110 and linear CODECs 131 through 135 and 150, and selection logic 140 all receive timing information from a timing circuit 153. Five light emitting diodes (LEDs) 152-1,-2,-3,-4,-5 are included in the CAM circuitry 100 for providing a visual indication for initial calibration of the CAM circuitry 100 as well as for providing a general visual indication to individuals present in the conference room as to which general area of the room is being covered by the microphone or microphones selected by the CAM circuitry 100.

In operation, each analog input signal from each microphone inputted into the CAM circuitry 100 is respectively amplified by one of the linear amplifiers 121 through 125. Amplifiers suitable for use as amplifiers 121 through 125 are commercially available. Such an amplifier is the MC34074 unit available from, for example, Motorola. From each amplifier 121 through 125, the associated analog signal is respectively coupled into 16-bit linear CODECs 131 through 135 where each analog signal is digitized. CODECs suitable for use as CODECs 131 through 135 are commercially available. Such a CODEC is the AT&T 7525 unit available from, for example, AT&T Corp. Economical mu-Law CODECS are also available and will suitably provide the desired functions required by CODECs 131 through 135 and 150.

From the CODECs 131 through 135, each 16-bit digitized signal is serially loaded into two cascaded 8-bit serial-to-parallel registers. Five pairs of these cascaded registers respectively comprise the serial-to-parallel converters (SIPO) 141 through 145. Serial-to-parallel converters suitable for use as converters 141 through 145 are known in the art and are available from, for example, Motorola as part number MC74299.

The microphone input signals are weighted and summed together by DSP 110 to form the desired unitary microphone output signal. DSP 110 illustratively may comprise digital signal processor hardware such as the AT&T Corp. DSP16 or DSP32C along with read-only-memory (ROM) for storing software, which performs the processing operations described later herein, and random access memory (RAM) for storing DSP 110 results.

Through use of the selection logic circuit 140, the DSP 110 sequentially selects each one of the ten cascaded serial-to-parallel registers in converters 141 through 145 and reads in this data, 8-bits at a time through the lower 8-bits of its parallel-port. The DSP 110 provides a control signal to selection logic circuit 140 over line 101 at the proper time to allow the selection logic circuit to enable the appropriate one of the registers and thereby provide the correct 8-bit data signal to the DSP 110. Decoder circuits suitable for use as selection logic circuit 140 are known in the art and are available from, for example, National Semiconductor as part number 74154.

After the data input signals from the five microphones are received into DSP 110 and processed, as described in detail later herein, a 16-bit digital output signal is serially transmitted from DSP 110 to linear CODEC 150 in the microphone output circuit. The CODEC output signal is then amplified and conditioned by amplifier 151 to provide a standard analog microphone output signal.

The microphone output signal is not limited to just one or two microphone input signals, but rather is the weighted sum of all the microphone input signals. A variable weighting factor is assigned to each microphone and is used for gradually turning on or off the signal from each selected or activated microphone that is coupled to the audio line. The weighting factor is typically large for the selected microphone(s) and zero for the non-selected microphones. Since these weighted factors are adjusted gradually, the selection of a microphone and changes in the level of background noise are therefore less noticeable to the users. During intervals of transitions in conversations the weighting factor may be relatively large for several microphones simultaneously.

A linear CODEC suitable for use as CODEC 150 is available from, for example, AT&T Corp. as part number AT&T 7525. An amplifier suitable for use as amplifier 151 is available from, for example, Motorola as part number MC34074. The timing circuit 153 includes a 26 MHz crystal oscillator for the DSP 110 as well as a 2.048 MHz signal used by the CODECs for synchronization and transmission of data.

Figure 2:
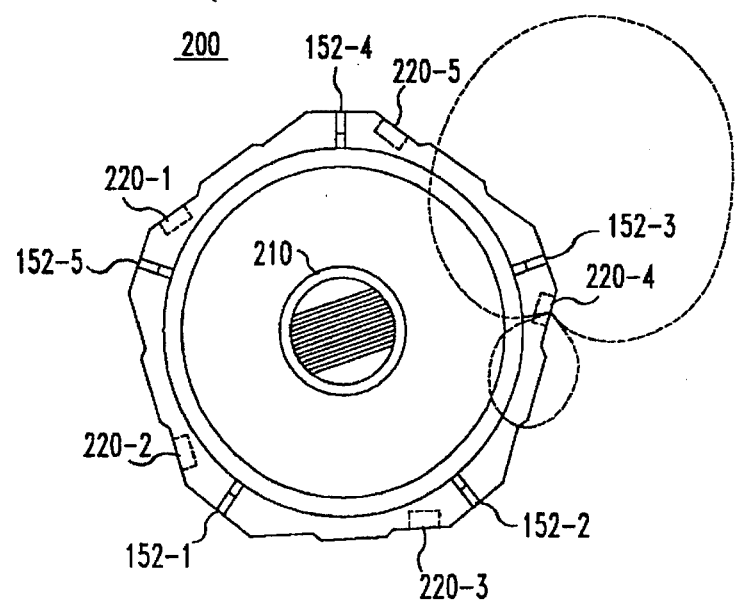
FIG. 2 is a top plan view of a conference array housing for enclosing the microphone circuitry shown in FIG. 1.

Shown in FIG. 2 is a top plan view of a CAM housing 200 including upwardly aimed loudspeaker 210, microphones 220-1,-2,-3,-4,-5, and LEDs 152-1,-2,-3,-4,-5 embedded in this housing. In the disclosed embodiment, the CAM housing 200 is configured with a plurality of directional first-order-gradient microphones of the type described in U.S. Pat. No. 5,121,426 which issued on Jun. 9, 1992. These microphones are mounted in a pentagon shaped housing illustrated by Des. U.S. Pat. No. 327,479. The plurality of first-order-gradient microphones, illustratively shown as five, are positioned in the pentagon or generally circular shaped housing so as to face outward from the center of the housing and form supercardioid response patterns. The array of microphones provides full area coverage for a room which is most useful in a conference telephone application. Since only one person speaks at a time during normal operation, background noise and reverberation are minimized by activating only the microphone which best receives that person's speech.

In accordance with the disclosed embodiment, the circuits shown in FIG. 1 are located within the CAM housing 200 and are arranged to compare the output signals from each of the microphones 220-1,-2,-3,-4,-5 to determine which one or more of these microphones is providing the stronger speech signals. In response, the signals from the selected microphone or microphones are transmitted to a conference participant at a remote location without the reverberation that normally results when more than one microphone is activated.

Loudspeaker 210 is located in the null of the polar response pattern of each of the microphones embedded in the housing 200. The null of the polar response pattern resides between the main lobe and an adjacent side lobe. This particular null is located at 125°—which accounts for the particular positioning of the microphones around the perimeter of the housing 200. This performance is achieved by placing a microphone element, as disclosed in U.S. Pat. No. 5,121,426, into the housing, thus forming a supercardioid polar response pattern. Although only the polar response pattern associated with a single microphone 220-4 is shown in FIG. 2, the response patterns of each of the microphones in the housing are identical. It is noted that the housing and the microphones contained therein cooperate to determine the shape of the response pattern.

Figure 3:
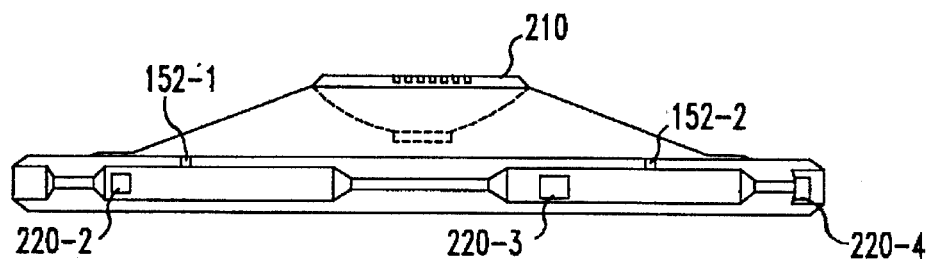
FIG. 3 is a front view of the conference array housing shown in FIG. 2.

A front view of the CAM housing 200 is shown in FIG. 3 to illustrate the relative positioning of three of the microphones 220-2, 220-3 and 220-4, and to demonstrate that such units can be attractively packaged in a low-profile product.

Figure 4:
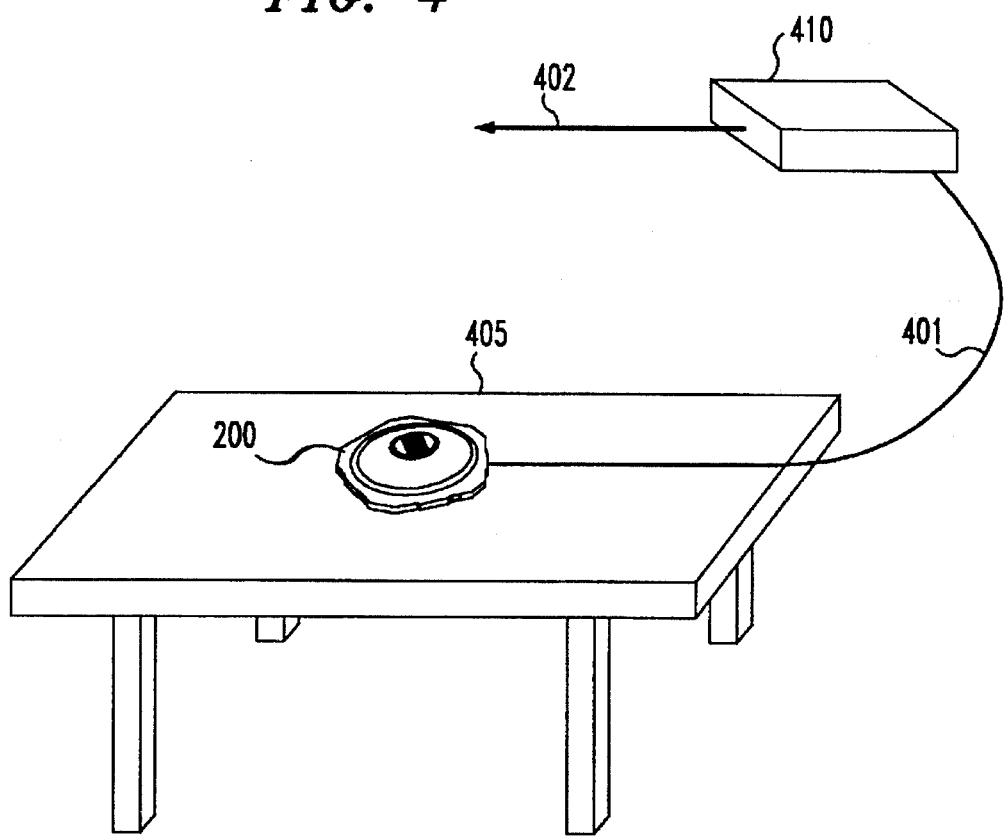
FIG. 4 is a teleconference system in which the present invention may be employed.

Shown in FIG. 4 is an embodiment of a teleconference system which includes the CAM housing 200 positioned in the center of a conference table 405. The CAM circuitry 100, incorporated in the CAM housing 200, is connected to a control unit 410 in the system by a cable 401 which may either pass through the table 405 via a hole drilled therein or may rest on the table top. This cable contains suitable wiring for conveying both the microphone output signal from the CAM housing 200 to the control unit and the input signal to the speaker 210 from the control unit 410. The cable also includes wiring for conveying power to a conventional power supply (not shown) in the CAM circuitry 100 which provides operating power for the circuitry shown in FIG. 1.

The control unit 410 is interconnected to a telephone tip-ring line (not shown) via line 402 for providing conventional telephone service for the teleconference system. The control unit receives the microphone output signal from amplifier 151, as shown in FIG. 1, and also directly provides an input signal for the speaker 210, shown in both FIGS. 2 and 3. A control unit suitable for use as control unit 410 is described in U.S. Pat. No. 5,007,046 entitled *Computer Controlled Adaptive Speakerphone* which is herein incorporated by reference. This control unit provides an improved switched-loss, adaptive speakerphone which dynamically adjusts its switching thresholds and other performance parameters based on an analysis of acoustic environment and telephone line conditions. The control unit disclosed in the referenced patent receives an output from a microphone and provides an input to a speaker for providing a speakerphone arrangement. The microphone output signal provided by amplifier 151 is readily substitutable for the microphone shown in the disclosed speakerphone arrangement. An alternative controlling arrangement suitable for use as control unit 410 is described in U.S. Pat. No. 5,016,271 entitled *Echo Canceler-Suppressor Speakerphone* which is also herein incorporated by reference. Near-full and full duplex operations are regularly achieved with this alternative controlling arrangement since the receive path remains open at all times and the transmit path has its gain reduced only to the level necessary to suppress excess reverberant return echo.

Although the control unit 410 is shown as being apart from the CAM circuitry 100, it is to be understood that such control unit may also be integrated into the electronics inside the CAM housing 200. Even further, it is also to be understood that the CAM circuitry 100, when using well known cordless telephone circuitry, such as that in AT&T Corp.'s 5500 HT cordless telephone set, may also be assembled so as to obviate the need for any cabling whatsoever between itself and a base unit or control unit which connects to the telephone tip-ring line. Such suitable cordless telephone circuitry is also disclosed in U.S. Pat. No. 4,736,404. For this cordless telephone circuitry as well as the CAM circuitry 100, a battery may be used for providing a suitable source of operating power.

Figure 5:
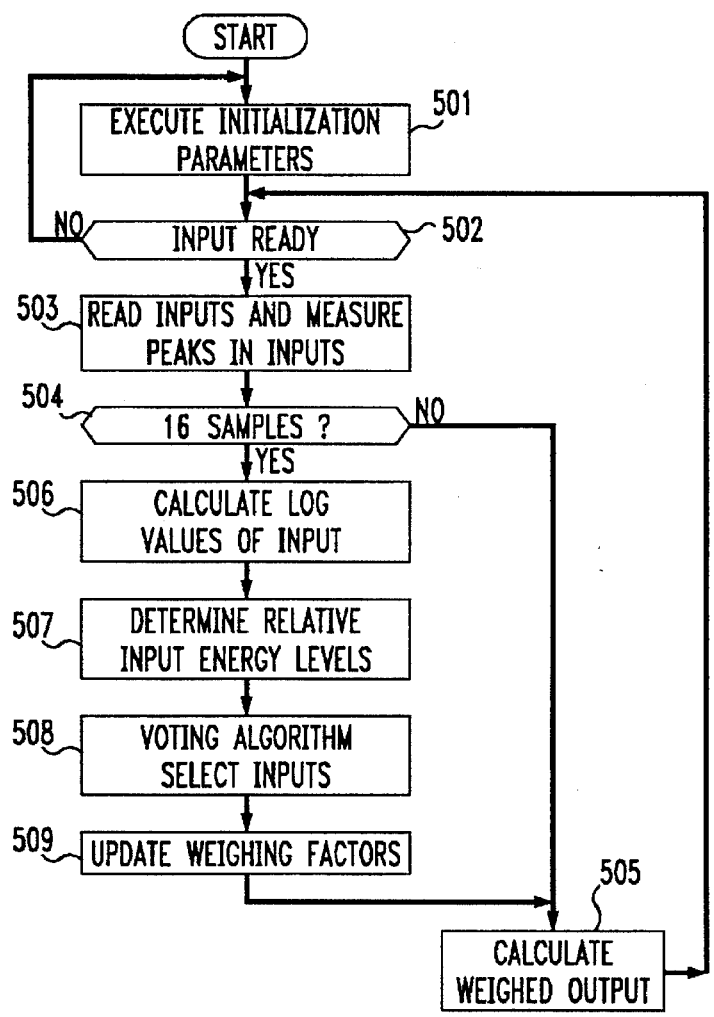
FIG. 5 is a flow chart of a process suitable for incorporation into the digital signal processor shown in FIG. 1, in accordance with the invention.

Referring next to FIG. 5, there is shown a flow chart illustrating the operation of the DSP 110 in executing the microphone selection operation. The functions provided by DSP 110 are advantageously determined by a process or program stored in associated read-only-memory (not shown).

The process is entered at step 501 where the initializing parameters are set. As part of these parameters, the weighting factor, described later herein, of any one of the five microphones, illustratively 220-1, is set to 1 thereby effectively turning ON that microphone. When this microphone is ON, first syllable clipping advantageously is not perceived by conferees because some speech signal always will be transmitted, even if it is attenuated due to the relative position of the ON microphone to the person speaking. Certain other initializing parameters are executed in accordance with U.S. Pat. No. 5,007,046. Once this initialization is performed and verified in decision 502, the circuitry is ready for signal data input and the process advances to step 503.

During each sampling period or every 125 μs, each one of the microphone inputs is sampled in step 503 for determining peak absolute values in the speech energy input. Also in each sampling period, the input value for each microphone is adjusted in accordance with its assigned weighting factor and then the weighted outputs of all the microphones are summed together onto a common audio line. The peak absolute values for the microphones are acquired from 16 samples over a 2-millisecond (ms) cycle period in order to obtain the highest absolute peak value occurring within this time period for each microphone. If during this cycle period of 2 ms, a subsequently measured peak value is greater than a previously measured and stored peak value, then the previously stored peak value is replaced with the subsequently measured peak value. If the previously measured peak value is greater than the subsequently measured peak value, however, then the previously measure peak value is retained in memory. The peak-absolute-value for each of the five microphone inputs is thereby determined in step 503 during each cycle period. The 16 samples gathered during each cycle period permit tracking the signal envelope for each microphone at 300 Hz, the lowest frequency of interest.

If 16 samples in the speech energy have not been measured for each microphone in step 503, as determined in decision 504, the process advances to step 505 where the weighted output for each microphone is calculated. This calculation is performed in accordance with the data processing rate or every 125 μs. If the CAM 100 has just been activated, the initializing parameters, as provided in step 501, determine the weighted output and thus the input signal just from the initially selected microphone is coupled to the analog output line at this point in the process. Once initialization is complete, however, the microphones in the CAM 100 are configured either in the ON or OFF state or in transition between these two states in accordance with the acoustics present in the room.

After 16 peak input values in the speech energy have been measured for each microphone, as determined by decision 504, the selected one of the peak input values is used to calculate a logarithmic value, for example, a log 10 or decibel calculation, of the signal for each of the five microphone inputs in step 506. These logarithmic values, which simplify calculations of the relative signal strengths, are then used in step 507 to determine relatively long- and short-term envelope energy for each of the five microphone peak inputs, the determination of the long- and short-term envelope energy being described in greater detail later herein with reference to FIG. 6.

The envelope energy determined in step 507 is used by a voting algorithm or process in step 508 to select which microphone signal input(s) are to be passed through to the output. In executing the selection process, in one disclosed embodiment, the voting algorithm makes comparisons based on the maximum microphone signal selecting either 1) the current microphone; 2) an opposite microphone; or 3) both the current and an opposite microphone if their speech signal levels are relatively strong; or 4) under less restrictive criteria, the microphone with the strongest signal. Taken in the order given, each of the foregoing comparisons is made in a less restrictive manner than the one that precedes it. If the speech signal levels of the current and an opposite microphone are not sufficiently strong, the voting algorithm may choose any microphone based on less restrictive thresholds. When the speech signal levels are close to the background noise level, the voting algorithm makes comparisons only between the currently selected and two opposite microphones, remaining with the selected microphone if the comparisons are inconclusive.

Once the microphone input(s) are selected for activation or deactivation in step 508, the variable weighting factor for each microphone is updated in step 509 during each cycle period of 2 ms and these weighting factors then used in determining the level of the signal for each microphone that gets coupled to the output. Thus, in accordance with its selection or nonselection, the output from a microphone either remains ON, OFF, or is caused to transition toward one or the other of these two states in the calculation performed by step 505.

As noted, the output from the CAM circuitry 100 is a weighted signal derived from all the microphones, not simply those selected by the voting algorithm to be active or configured ON by this algorithm. Thus, when a microphone is selected to be active by the voting algorithm, its input is gradually added to or made a greater percentage of the output signal. Similarly, when a microphone is no longer selected or configured OFF after having been selected by the voting algorithm, its input is gradually removed from the output signal. First syllable clipping is also advantageously not perceived because at least one microphone is left on at all times, and speech generated anywhere in the room will be immediately detected and transmitted, even if attenuated.

The activation and deactivation weighting factor for a microphone is shown by:

$$W_i = \begin{cases} W_i = W_i + 0.05 \text{ if microphone}_i \text{ is configured ON} \\ W_i = W_i - 0.01 \text{ if microphone}_i \text{ is configured OFF} \end{cases}$$

and $$O = \sum_{i=1}^{5} I_i W_i$$

where:

$W_i$ is the weighting factor for microphone$_i$ having a range between 0 and 1.0;

$I_i$ is one of the five microphone inputs; and $O$ is the output value for the sum of each microphone's weighted signal.

Thus, a microphone being turned-on is activated five times faster than a microphone being turned-off. One major advantage of this activation and deactivation arrangement is that any background noise that does not get removed, by the noise removal process described later herein, is less noticeable if added and removed along with the microphone signal. This arrangement also permits multiple microphones to be ON at once because of the differences in the delays in the weighting factors for activating and deactivating the microphones. Thus, any undesirable side effects of the voting algorithm switching rapidly between microphones, such as that caused in hard-switching (immediately turning a microphone full-on or full-off), is eliminated. Thus, in effect, many people may respectively speak into and activate different microphones at the same time. To the extent that each person continues to speak, his or her microphone will remain ON or activated.

Figure 6:
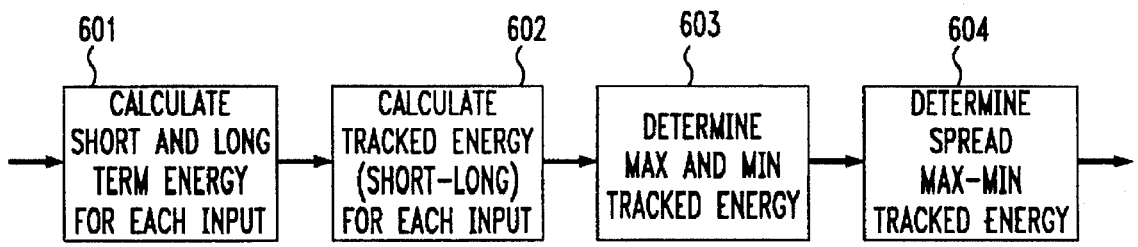
FIG. 6 is a flow chart of a process which shows in greater detail a portion of the process shown in FIG. 5.

Referring now to FIG. 6, there is shown a flow chart illustrating the steps involved in obtaining the measurements of the relative signal strengths for each of the microphones by the CAM circuitry 100. These steps 601 through 604 are all part of the step 507 executed in FIG. 5. Since the voting algorithm determines when one or more persons is speaking and then activates the microphone or microphones that best receives these speech signals, a critical component of this calculation is to correctly determine when the input signal from a microphone is that of speech and not just noise. The steps executed by the flow chart of FIG. 6 advantageously provides this information for use by the voting algorithm.

The received signal strength is calculated as in step 601 by averaging the peak-absolute-value selected for each microphone input, each peak-absolute-value being selected from those occurring over a 2 ms cycle period. There is both a short and a long-term energy average generated which represents speech signal strength and noise signal strength respectively. Different averaging factors are selected depending on whether the slope of the input values are positive or negative. When the slope is positive, the input values are increasing in strength and when the slope is negative, the input values are decreasing or decaying in strength. Both averages are calculated as $$rec_{s_n} = \begin{cases} 0.2I_n + (1 - 0.2)rec_{s_{n-1}} & \text{if } I_n \geq rec_{s_{n-1}} \\ 0.005I_n + (1 - 0.005)rec_{s_{n-1}} & \text{if } I_n < rec_{s_{n-1}} \end{cases}$$

$$rec_{l_n} = \begin{cases} 0.00024I_n + (1 - 0.00024)rec_{l_{n-1}} & \text{if } I_n \geq rec_{l_{n-1}} \\ 0.025I_n + (1 - 0.025)rec_{l_{n-1}} & \text{if } I_n < rec_{l_{n-1}} \end{cases}$$

where:

$rec_s$ and $rec_l$ are the respective short and long-term signal averages;

$I_n$ is the peak signal value for each input during the current cycle period; and $I_{n-1}$ is the peak signal value for each input during the previous cycle period.

Both quantities $rec_{s_n}$ and $rec_{l_n}$ are used in calculating the speech signal strength. The quantity $rec_{l_n}$ is a measure of background noise. The quantity $rec_{s_n}$ is a measure of intermittent signals such as voice, or any other sharp noise, along with any background noise. As indicated in step 602, the speech signal strength or tracked signal energy value, $rec_{t_n}$ for each microphone is calculated by subtracting the long-term average $rec_{l_n}$ from the short-term average $rec_{s_n}$ thusly:

$$rec_{t_n} = rec_{s_n} - rec_{l_n}$$

or

SPEECH=(SPEECH+NOISE)−NOISE

Since these are logarithmic values, the quantity $rec_{t_n}$ is not the difference in magnitude between the short and long term signal average values, but rather the ratio of the magnitudes of these two values.

The tracked signal values of each microphone are then sorted as in step 603 to determine maximum and minimum tracked signal energy values, RECMAX and RECMIN respectively, among all of the microphones. Next SPREAD, which is the difference between RECMAX and RECMIN, is calculated in step 604. Since the background noise level is effectively removed from each microphone input, SPREAD should be at or close to zero when no intermittent signals are present. When SPREAD is greater than zero by some threshold, therefore, the voting algorithm interprets this as an indication that a speech signal is present and then looks at the respectively tracked signal strength value for each microphone to determine the source of the speech signal. SPREAD is a measure which is used to indicate that an intermittent signal such as a speech signal is present.

In response to the input parameters presented, the selection process selects the microphone which best picks up the speech sound or signal. In selecting this microphone, the tracked signal strength values for the microphones are compared to each other. More specifically, pairs of microphones are examined, to determine the direction of origin for the speech, by seeking a microphone pair where the speech is strong in the forward facing microphone, i.e., the microphone directed toward the source of speech, and weak in the backward facing microphone, i.e., the microphone directed away from the source of speech. The speech is assumed to be in the null of the backward facing microphone. The null of each microphone is more narrow, and therefore more sensitive to direction, than is the main beam. The combination of the two microphones provides a better measure of the directionality of the speech signal.

Figure 7:
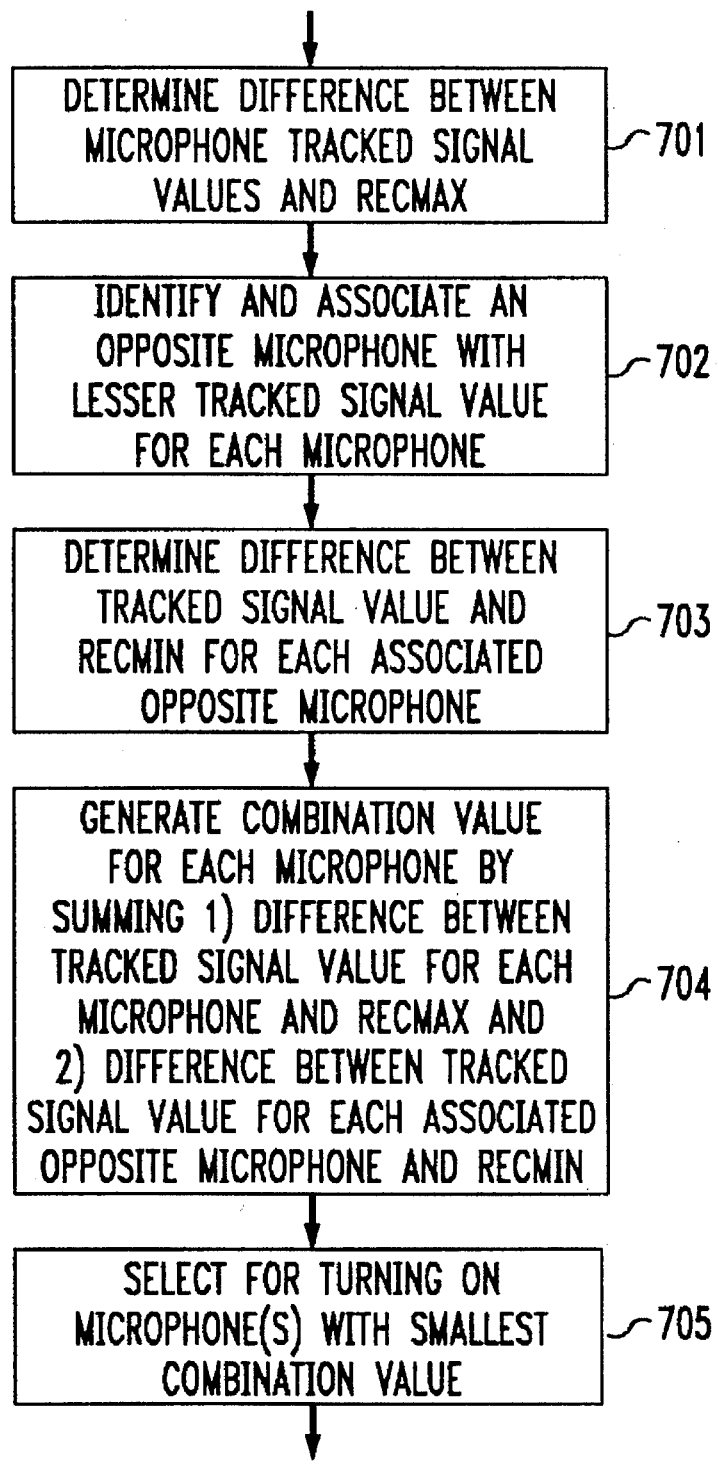
FIG. 7 is a flow chart of a process which shows in greater detail a portion of the process shown in FIG. 5.

Referring now to FIG. 7, there is shown in accordance with an embodiment of the invention, a flow chart showing additional steps embodied in step 508 of FIG. 5 which use the SPREAD, RECMIN and RECMAX values in selecting the appropriate microphone or microphones to be active.

As earlier indicated, the voting algorithm determines if a speech signal is present and selects the microphone(s), or beam(s), which optimally or best receive the speech signal (s). It uses the tracked signal values for each microphone or beam, the beam pattern being indicative of a particular microphone, and the RECMAX, RECMIN and SPREAD values to make decisions. As also earlier indicated herein, the microphones 220-1 ,-2,-3,-4,-5 are mounted in a pentagon shaped housing as clearly illustrated in FIG. 2. Thus, each one of the plurality of microphones is considered to have two opposite microphones. For example, microphone 220-1 has two generally opposite microphones, microphone 220-3 and microphone 220-4. When the CAM circuitry 100 is in its active state or ON, the relative input energy levels of each microphone input is determined and either a single or two microphones are selected and remain on.

In accordance with the disclosed embodiment, the use of the calculation of SPREAD is for determining if there is an intermittent signal such as speech present in the room. Since the RECMIN and RECMAX values are relative to the background noise level, they will both be zero if no speech is present. Even in very noisy environments, the value of RECMAX also is an indicator that speech is present, however, such speech is less likely to be a single source in such an environment.

In the execution of the voting algorithm, the microphone selection process, as generally shown in step 507 of FIG. 5, decides whether to reconfigure any microphones that are configured ON to OFF or reconfigure any microphones from OFF to ON. As indicated earlier herein, this voting procedure never turns all the microphones OFF.

In response to the SPREAD, RECMAX and RECMIN values, the microphone selection process selects the microphone which best picks up the speech signal. In selecting this microphone, the tracked signal energy values for all of the microphones are compared to each other. More specifically, pairs of microphones are examined, to determine the direction of origin for the speech, by seeking a microphone pair where the speech is strong in the forward facing microphone, i.e., the microphone directed toward the source of speech, and weak in the backward facing microphone, i.e., the microphone directed away from the source of speech. Since the null of each microphone is more narrow than the main beam, this null is more sensitive to and therefore a better indicator of the direction of origin for the speech than is the main beam. Thus the combination of the signal energy from the two microphones provides a simplified but completely suitable measure for determining the direction of origin for speech.

In co-pending U.S. patent application Ser. No. 08/239771, numerous comparisons are made in executing a microphone selection process which identifies the microphone or microphones that are directed toward the source of the speech signal. Because of the numerous comparisons made for each possible condition of the CAM circuitry 100, there is a significant amount of redundant calculations. For example, as described in co-pending patent application Ser. No. 08/239771, for the typical case when one microphone or beam is currently selected to be ON, and the SPREAD is large, the process continually recycles through processing steps described therein for determining if 1) the same microphone should continue to be ON, 2) an opposite microphone should be selected instead, or 3) the same microphone and the opposite microphone should both be ON. If none of these three tests proves satisfactory, a worst case condition, the process then checks each input and chooses the first input exceeding a minimum threshold amount which is indicative of the presence of a low level speech signal. Otherwise, it chooses to remain with the currently selected microphone.

While the worst case may not occur too often, it is the one which requires the most processing time. Often in software systems, a limited amount of processing time can be guaranteed on a periodic basis, but hardly ever are large amounts available on demand. It is better typically to require a bounded amount of processing to be performed in an allocated amount of processing time. And acceptable results are achievable in the microphone selection process which limits the analysis that provides the best worst-case performance at the expense of somewhat worsening the possible best-case performance.

In order to make the microphone selection process executed by the voting algorithm relatively constant in terms of processing requirements, combination values, indicative of a measure of "goodness" or figure of merit for each microphone, are calculated through a five step process described herein below. Through use of these combination values, a comparison to a single number advantageously may be made, rather than making a series of calculations and comparisons. A reference combination value of zero is selected to be an indicator of a measure of the best acoustical condition, and any value other than zero is a measure of how far removed from the best acoustical condition the measured combination value is.

If, by way of example, the tracked signal energy value $rec_{t_n}$ for each of microphones 220-1 through 220-5, illustratively shown in FIG. 2, appear as:

| 1) Microphone | 220-1 | 220-2 | 220-3 | 220-4 | 220-5 |
|---|---|---|---|---|---|
| $rec_{t_n}$ | 1 | 2 | 3 | 4 | 5 | where, in this example,

RECMAX=5, RECMIN=1, and SPREAD=4.

RECMAX is the maximum tracked signal energy value occurring in one microphone which exceeds the tracked signal energy value occurring in any one of the other microphones. RECMIN is the minimum tracked signal energy value occurring in one microphone which is smaller that the tracked signal energy value occurring in any one of the other microphones. And SPREAD is the difference between RECMAX and RECMIN. The first step, as illustrated in step 701 of FIG. 7, in determining the combination value is to determine the difference between the value of $rec_{t_n}$ for each microphone and RECMAX:

| 2) Microphone | 220-1 | 220-2 | 220-3 | 220-4 | 220-5 |
|---|---|---|---|---|---|
| RECMAX-$rec_{t_n}$ | 4 | 3 | 2 | 1 | 0 |

The next step, shown as step 702 in FIG. 7, is to identify and associate the opposite microphone (Opp-mike) having the lesser or smaller tracked signal energy value $rec_{t_n}$. In the disclosed embodiment employing a pentagon shaped housing, the opposite microphone can be either the second or third microphone following a microphone (i.e., 220-3 has opposite microphones 220-5 and 220-1). Because of the illustratively assigned tracked signal energy values, the microphones are paired thusly:

| 3) Microphone | 220-1 | 220-2 | 220-3 | 220-4 | 220-5 |
|---|---|---|---|---|---|
| Opp-mike | 220-3 | 220-4 | 220-1 | 220-1 | 220-2 |

Once the opposite microphone for each microphone is identified, the difference between each opposite microphone value $rec_{t_n}$ and RECMIN is calculated and this value then shown under its associated microphone thusly:

| 4) Microphone | 220-1 | 220-2 | 220-3 | 220-4 | 220-5 |
|---|---|---|---|---|---|
| $rec_{t_n}$-RECMIN | 2 | 3 | 0 | 0 | 1 |

Finally, the combination value for each microphone pair is calculated from the sum of microphone values obtained in steps 2 and 4 for the microphone pair thusly:

| 5) Microphone | 220-1 | 220-2 | 220-3 | 220-4 | 220-5 |
|---|---|---|---|---|---|
| Combination value | 6 | 6 | 2 | 1 | 1 |

The results, as provided in this illustrative example, indicate that either microphone 220-4 or microphone 220-5 would be good choices and either one or both are selected by the process, since they have combination values of only 1 away from the ideal value of zero. Such results, as obtained from this example, are not unexpected since the initial values of $rec_{t_n}$, the tracked signal energy value respectively for each microphone, are chosen simply as an integer sequence for clarity and ease of understanding. Finer delineations in $rec_{t_n}$ are obtainable and readily employable in even the simplest microprocessor and such variations are anticipated. When such delineations are employed, the ideal case or best match between the source of speech and a microphone occurs, quite frequently, in practice.

Various other modifications of this invention also are contemplated and may obviously be resorted to by those skilled in the art without departing from the spirit and scope of the invention as hereinafter defined by the appended claims.

The invention claimed is:

1. A method of selecting a microphone from a plurality of microphones for transmitting speech signals from said microphone to an output line, the method comprising the steps of:

measuring a level of speech signals appearing in each of the plurality of microphones responsive to speech sounds, the level of said speech signals in each of the plurality of microphones being determined by a direction of origin for said source of speech sounds;

arranging the plurality of microphones in microphone pairs, a first microphone in each microphone pair having a main beam sensitivity pattern extending in a first direction and a second microphone in each microphone pair having a null pattern extending generally in said first direction;

combining the level of speech signals appearing in said first and second microphones in each one of said microphone pairs for obtaining microphone-pair combination values; and comparing each microphone-pair combination value for identifying a microphone pair in which said first microphone best receives said speech sounds.

2. The method of claim 1 further including the step of mounting the plurality of microphones on the perimeter of a circular shaped housing so as to face outward from the center of said housing and form supercardioid response patterns.

3. The method of claim 2 wherein said circular shaped housing is pentagon shaped.

4. The method of claim 2 wherein said plurality of microphones are first-order-gradient microphones.

5. The method of claim 4 wherein said plurality of microphones are arranged in said housing by said mounting step so as to provide area coverage for speech sounds emanating in a room.

6. The method of claim 1 wherein said comparing step further includes the step of comparing each microphone-pair combination value with a reference combination value, said reference combination value providing a measure of a best acoustical condition for said first microphone to receive said speech sounds.

7. The method of claim 6 wherein said comparing step further includes the step of selecting a microphone-pair combination value that is closest to said reference combination value.

8. The method of claim 1 wherein said speech signals are measured tracked signal energy values.

9. The method of claim 8 wherein said measuring step further includes the step of determining a difference between the tracked signal energy value in each of the plurality of microphones and a maximum tracked signal energy value in any one of the plurality of microphones.

10. The method of claim 9 wherein said arranging step further includes the step of identifying said second microphone for each microphone pair, said second microphone being one of at least two microphones having main beam sensitivity patterns extending in a second direction which is generally opposite to said first direction and said second microphone being the one of said at least two microphones having a smaller tracked signal energy value.

11. The method of claim 10 wherein said determining step, responsive to said identifying step, determines a difference between the tracked signal energy value in said second microphone and a minimum tracked signal energy value in any one of the plurality of microphones.

12. The method of claim 11 wherein said comparing step further includes the step of comparing each microphone-pair combination value with a reference combination value, said reference combination value providing a measure of a best acoustical condition for said first microphone to receive said speech sounds.

13. The method of claim 12 wherein said comparing step further includes the step of selecting a microphone-pair combination value that is closest to said reference combination value.

14. The method of claim 13 further including the step of connecting to the output line the first microphone in the microphone pair with said microphone-pair combination value that is closest to said reference combination value.

15. A voice-actuated switching apparatus for selecting a microphone from a plurality of microphones for transmitting speech signals from said microphone to an output line, the apparatus comprising:

means for measuring a level of speech signals appearing in each of the plurality of microphones responsive to speech sounds, the level of said speech signals in each of the plurality of microphones being determined by a direction of origin for said source of speech sounds;

means for arranging the plurality of microphones in microphone pairs, a first microphone in each microphone pair having a main beam sensitivity pattern extending in a first direction and a second microphone in each microphone pair having a null pattern extending generally in said first direction;

means for combining the level of speech signals appearing in said first and second microphones in each one of said microphone pairs for obtaining microphone-pair combination values; and means for comparing each microphone-pair combination value for identifying a microphone pair in which said first microphone best receives said speech sounds.

16. The voice-actuated switching apparatus of claim 15 further including means for mounting the plurality of microphones on the perimeter of a circular shaped housing so as to face outward from the center of said housing and form supercardioid response patterns.

17. The voice-actuated switching apparatus of claim 16 wherein said circular shaped housing is pentagon shaped.

18. The voice-actuated switching apparatus of claim 16 wherein said plurality of microphones are first-order-gradient microphones.

19. The voice-actuated switching apparatus of claim 18 wherein said plurality of microphones are arranged in said housing by said mounting means so as to provide area coverage for speech sounds emanating in a room.

20. The voice-actuated switching apparatus of claim 15 wherein said comparing means further includes means for comparing each microphone-pair combination value with a reference combination value, said reference combination value providing a measure of a best acoustical condition for said first microphone to receive said speech sounds.

21. The voice-actuated switching apparatus of claim 20 wherein said comparing means further includes means for selecting a microphone-pair combination value that is closest to said reference combination value.

22. The voice-actuated switching apparatus of claim 15 wherein said speech signals are measured tracked signal energy values.

23. The voice-actuated switching apparatus of claim 22 wherein said measuring means further includes means for determining a difference between the tracked signal energy value in each of the plurality of microphones and a maximum tracked signal energy value in any one of the plurality of microphones.

24. The voice-actuated switching apparatus of claim 23 wherein said arranging means further includes means for identifying said second microphone for each microphone pair, said second microphone being one of at least two microphones having main beam sensitivity patterns extending in a second direction which is generally opposite to said first direction and said second microphone being the one of said at least two microphones having a smaller tracked signal energy value.

25. The voice-actuated switching apparatus of claim 24 wherein said determining means, responsive to said identifying means, determines a difference between the tracked signal energy value in said second microphone and a minimum tracked signal energy value in any one of the plurality of microphones.

26. The voice-actuated switching apparatus of claim 25 wherein said comparing means further includes means for comparing each microphone-pair combination value with a reference combination value, said reference combination value providing a measure of a best acoustical condition for said first microphone to receive said speech sounds.

27. The voice-actuated switching apparatus of claim 26 wherein said comparing means further includes means for selecting a microphone-pair combination value that is closest to said reference combination value.

28. The voice-actuated switching apparatus of claim 27 further including means for connecting to the output line the first microphone in the selected microphone pair.

29. A voice-actuated switching system comprising:
a plurality of circuits for receiving speech sounds and for converting said speech sounds into speech signals;
means for measuring a level of said speech signals appearing in each of the plurality of circuits, the level of said speech signals in each of the plurality of circuits being determined by a direction of origin for said source of speech sounds;
means for arranging the plurality of circuits into circuit pairs, a first circuit in each circuit pair including means for optimally detecting signals originating in a first direction and a second circuit in each circuit pair including means for optimally detecting signals originating in a second direction, said second direction being generally opposite to said first direction.
means for combining the level of speech signals appearing in said first and second circuits in each one of said circuit pairs for obtaining circuit-pair combination values; and
means for comparing each circuit-pair combination value for identifying a circuit pair in which said first circuit best receives said speech sounds.

30. The voice-actuated switching system of claim 29 wherein said comparing means further includes means for comparing each circuit-pair combination value with a reference combination value, said reference combination value providing a measure of a best acoustical condition for said first circuit to receive said speech sounds.

31. The voice-actuated switching system of claim 30 wherein said comparing means further includes means for selecting a circuit-pair combination value that is closest to said reference combination value.

32. The voice-actuated switching system of claim 31 further including means, responsive to the selecting means, for connecting to an outside line the first circuit in the selected circuit-pair.

* * * * *